J. LEDWINKA.
CHANNEL STRUCTURE FOR TONNEAU PANELS.
APPLICATION FILED FEB. 27, 1919.
1,398,971.
Patented Dec. 6, 1921.
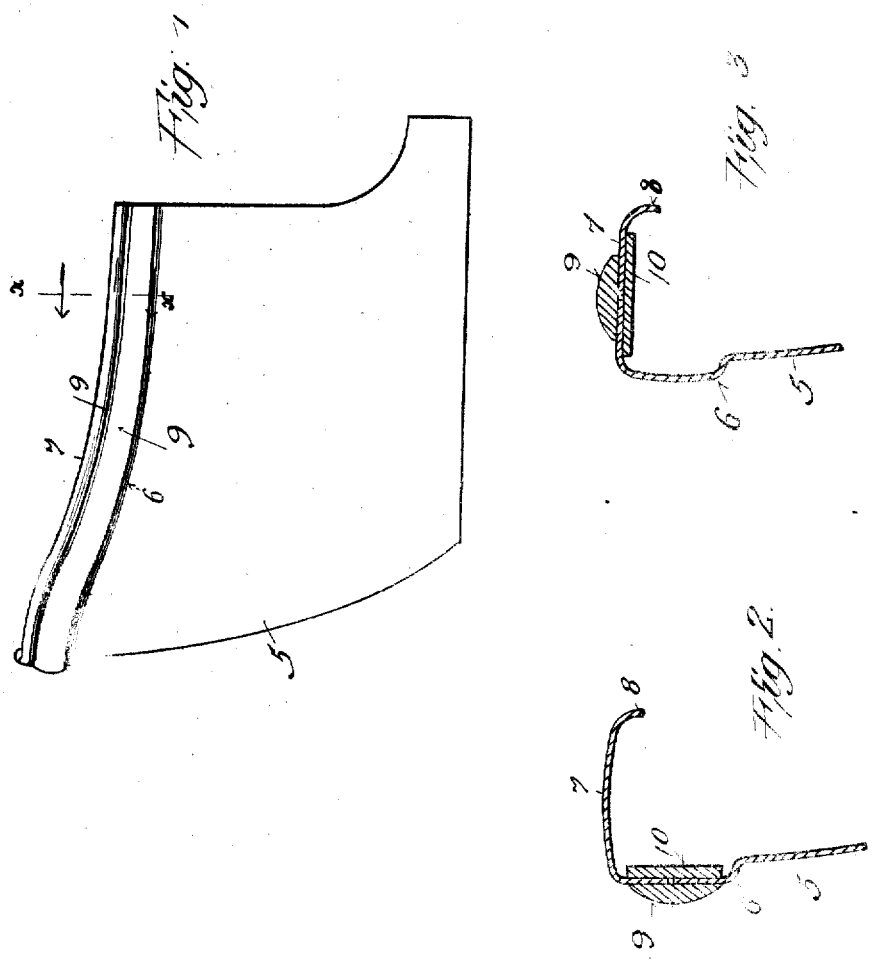
Inventor
Joseph Ledwinka
by his atty Samuel E. Darby

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

CHANNEL STRUCTURE FOR TONNEAU-PANELS.

1,398,971.  Specification of Letters Patent.  Patented Dec. 6, 1921.

Application filed February 27, 1919. Serial No. 279,589.

*To all whom it may concern:*

Be it known that I, JOSEPH LEDWINKA, a citizen of the United States, residing at Philadelphia, in the county of Philadelphia, State of Pennsylvania, have made a certain new and useful Invention in Channel Structures for Tonneau-Panels, (Case B,) of which the following is a specification.

This invention relates to channel structures for tonneau panels, and particularly to the structure of channels employed at the upper edge of a tonneau or seat back panel for automobiles.

The object of the invention is to provide a channel structure for the upper edge of a tonneau or seat back panel to form a neat and sightly appearing finish for such upper edge, and at the same time to afford a convenient means for the application and attachment of the upholstery to the panel.

Other objects of the invention will appear more fully hereinafter.

The invention consists substantially in the construction, combination, location, and relative arrangement of parts, all as will be more fully hereinafter set forth, as shown in the accompanying drawing, and finally pointed out in the appended claims.

Figure 1 is a view in side elevation of an automobile tonneau or seat back panel having a channel structure applied thereto and embodying my invention.

Fig. 2 is a broken view in vertical section through the upper edge of the panel on the line X, X, Fig. 1.

Fig. 3 is a view similar to Fig. 2 showing a slightly modified arrangement.

In the drawing reference numeral 5 designates a tonneau or seat back panel for automobiles. This panel may be of any suitable material and may be bent and shaped to any desired style or outline of curvature to form the sides and back of a tonneau or seat. A sheet steel panel well serves the purpose. At its upper edge the panel 5 is bent or deflected outwardly as indicated at 6 to form a ridge or bead, and the extreme edge thereof is bent over inwardly to form a flange 7 which terminates in a downwardly extending lip 8, thereby forming an inverted channel at the upper edge of the panel for the application or attachment therein of the upholstery ordinarily applied to automobile tonneaus and seat back bodies. Applied to the exterior surface of the offset portion 6 of the panel, see Fig. 2, is a rounded bead 9, and applied to the interior surface of said offset portion 6 is a strip 10, the strip 10, the bead 9, and the offset portion 6 disposed between them, are all secured together by riveting, welding, or otherwise.

It will be understood that the flange portion 7 may be integral with the upper edge of the panel, as indicated in Fig. 2, or it may be a separate member as indicated in Fig. 3.

Instead of applying the bead 9 and strip 10 to the exterior and interior surfaces respectively of the offset portion 6 of the panel, said bead and strip may be applied to the flange 7 as shown in Fig. 3. The application of the rounded bead 9 exteriorly, whether to the offset portion 6 or to the flange 7 forms a rounded molding, ornamentation and finish, and the application of the strip 10 on the interior surface not only reinforces and strengthens the panel but, in connection with the inverted channel formation above referred to, affords efficient means for the application and attachment of the upholstery or cushions ordinarily employed with tonneau or seat back bodies. The bead 9 and strip 10 are bent or shaped longitudinally to conform to the curvature of the tonneau or seat back panel or body.

From the foregoing description it will be seen that I provide an exceedingly simple, neat and sightly channel structure for the upper edge of a tonneau or seat back panel for automobiles which is strong and durable and affords a convenient means for applying and attaching the upholstery or cushions to such panels.

Having now set forth the objects and nature of my invention, and various structures embodying the principles thereof, what I claim as new and useful, and of my own invention, and desire to secure by Letters Patent is:—

1. The combination with a sheet steel panel bent or stamped into the shape and curvature to form the sides and back of a tonneau or seat, and having an inturned flange at its upper edge, of a bead and a securing strip respectively curved longitudinally to conform to the curvature of the panel and applied respectively to the inner and outer surfaces of and secured together and to said panel to form respectively an exterior finish and an interior means for the application and attachment of the upholstery within the channel formed by said flange.

2. The combination with a sheet steel panel bent or stamped into the shape and curvature to form the sides and back of a tonneau or seat, and having an inturned flange at its upper edge terminating in a downwardly extending lip to form an inverted channel, to receive the upholstery of an exteriorly applied rounded bead and an interiorly applied strip, both curved longitudinally to conform to the curvature of the panel, said strip, bead and panel being secured together.

3. The combination with a sheet steel panel bent or stamped into the shape and curvature to form the sides and back of a tonneau or seat, and having an inturned flange at its upper edge forming an inverted channel, said panel being offset outwardly intermediate said inturned flange and the body of said panel, of a bead and a securing strip respectively curved longitudinally to conform to the curvature of the panel, and applied to the exterior and interior surfaces respectively of the offset portion of the panel, and secured together and to said surfaces.

In testimony whereof I have hereunto set my hand on this 24th day of February, A. D. 1919.

JOSEPH LEDWINKA.